July 22, 1969　　　　　H. E. HAIGH　　　　　3,456,888
MILLING APPARATUS AND PROCESS
Filed May 20, 1964
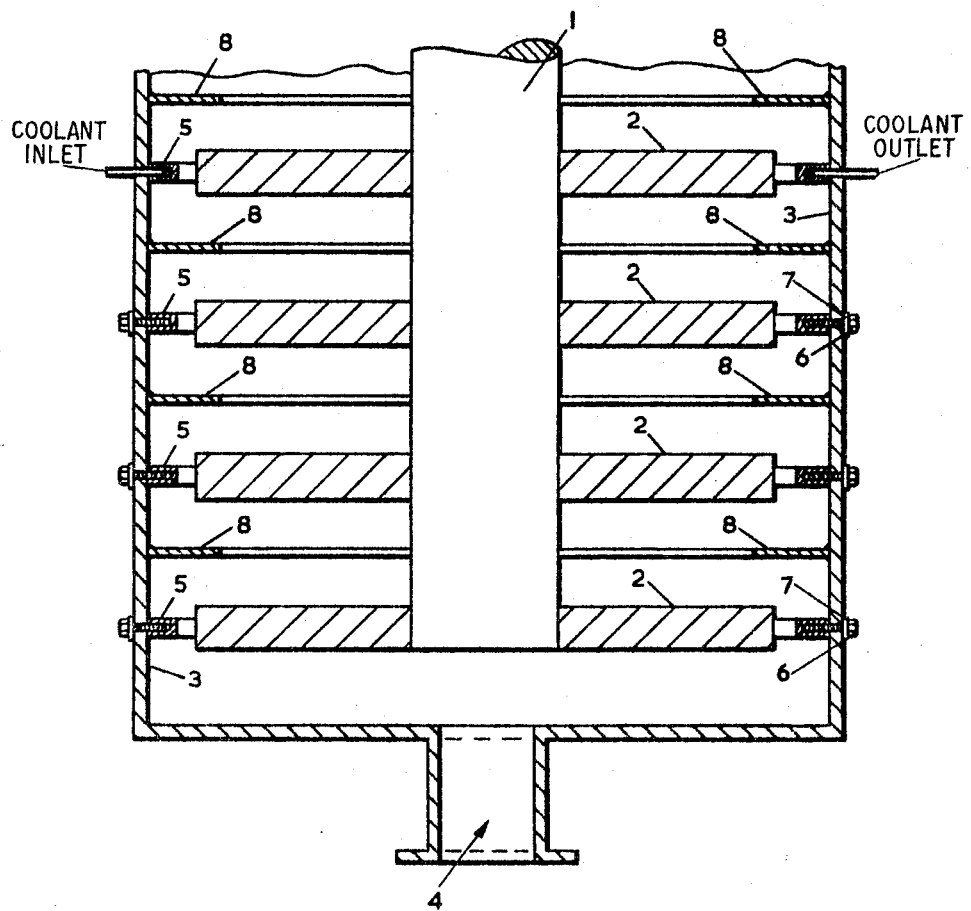
INVENTOR
HAROLD E. HAIGH
BY  Irons, Birch, Swindler
& McKie
ATTORNEYS 3,456,888
MILLING APPARATUS AND PROCESS
Harold Edward Haigh, Norton, England, assignor to British Titan Products Company Limited, Durham, England, a corporation of the United Kingdom
Filed May 20, 1964, Ser. No. 368,794
Claims priority, application Great Britain, June 13, 1963, 23,510/63
Int. Cl. B02c 7/08, 7/17, 7/175
U.S. Cl. 241—66     5 Claims The present invention relates to an improved apparatus and process for the milling of particulate solids in liquids. By the term "milling" is meant the grinding of particulate solids to reduce the particle size and the dispersion of a solid in a liquid (which may be unaccompanied by reduction in particle size).

It is known to mill particulate solids, for example pigment particles in liquids wherein the solids are agitated in the presence of a liquid and if desired a particulate milling medium (which may also act as a grinding medium). Such processes are hereinafter referred to as "sand" milling.

Suitable particles which may be used as particulate milling medium in such processes as the milling medium are those composed of silica, zircon, alumina, hard titanium dioxide particles or glass ballotini, preferably of a particle size in the range of about 150 to 3000 microns, particularly in the range 250 to 2500 microns and such particles are very suitable for use in the apparatus of the present invention.

Sand milling has been used to disperse solids in liquids, particularly pigments, for example titanium dioxide. It has also been used to reduce the size of particles of pigments, for example titanium dioxide, in order to increase the tinting strength of the pigment. Apparatus for carrying out such process are described in our British Patent 900,050, and in U.S. Patent 3,185,398 and British Patent 1,024,053.

One disadvantage of previously used sand milling processes, particularly when sand milling white pigments such as titanium dioxide, is the contamination of the pigment with material abraded from the container in which the material is being milled. This is particularly serious if the container is made from metal, for example a ferrous metal, since the presence of substantial amounts of metallic contaminants in the pigment causes a marked decrease in brightness.

The abrasion of the wall of the container and contamination of the pigment may be avoided by coating the whole of the inside of the container with a material such as polyurethane rubber which does not contaminate the pigment, even if abrasion occurs. However, under these circumstances, the material such as polyurethane rubber forms a poor heat conducting layer and it is consequently exceedingly difficult to cool the material being milled, for example by means of a water jacket around the outside of the container.

It is an object of the present invention to provide apparatus and processes for its use which reduces this problem of abrasion and concomitant contamination of the pigment.

Accordingly, the present invention is an apparatus for the sand milling of particulate solids, comprising a container into which projects a shaft carrying at least one impeller of increased diameter with respect to the shaft characterised in that the wall of the container carries an inwardly directed baffle, the inner face of which is opposite to the outer face of the impeller and is separated therefrom by a space.

The invention is also a process for sand milling comprising supplying a suspension of particulate solids to be milled in a liquid to the lower part of a container in which is rotated a shaft carrying at least one impeller, passing the suspension upwardly between the outer edge of the rotating impeller(s) and the inner edge of a baffle(s) inwardly projecting from the wall of the container opposite the impeller and recovering a suspension of milled solids in the liquid from the container.

The container is preferably a cylindrical container open at one end (the upper end when the container is in position) and having a supply orifice in the opposite end into which liquid and particulate solid to be milled may be introduced.

It is also preferred that the upper end of the container should be surmounted by a settling zone, for example in the shape of an inverted frusto-cone as described in U.S. Patent 3,185,398, in which the particulate milling medium preferentially settles and returns to the container.

Alternatively, the container may have a metal sieve of the appropriate dimensions at one end which retains the particulate milling medium while allowing the milled material to pass through. The material to be milled and the liquid will normally be supplied to the end of the container opposite to that having the sieve, in such apparatus.

The container may also be provided with baffles which project inwardly from the wall of the container between the impellers. These baffles will generally project inwardly so that their inner edges overlap the outer edges of the impellers. Apparatus of this type is described, for example, in British Patent 1,024,053.

The shaft carrying the impellers is conveniently a cylindrical shaft adapted to be driven by means of an electric motor.

The impellers, which are normally rigidly fixed to the shaft and rotate therewith, may be solid or hollow discs of diameter smaller than the internal diameter of the container in which they operate or they may be spoked annular impellers. They may carry projections upon their upper and/or lower surfaces, if desired. They may be conveniently from about 0.1 inch to 6 inches, preferably from 1 inch to 4 inches, in thickness.

It is preferred that there are at least two impellers on the shaft, but any number may be used, for example up to 12.

A convenient spacing of the impellers on the shaft is from 1 to 10 inches, although this distance may be greater or less, if desired.

The baffle, the inner face of which is opposite the outer face of the impeller or impellers is preferably in the form of a ring, the outer edge of which is fixed to the interior wall of the container, for example the baffle may be held in position by bolts passing through the wall of the container in the baffle or the container may be made up of cylindrical sections and the outer portion of the baffle may be clamped between these sections when in position. Alternatively, the baffle may be welded on to the interior wall of the container, although in such cases it is not readily exchanged.

It is convenient for dismantling and for assembly if the container is split vertically and held together by bolts, particularly when baffles which project between the impellers are also present.

It has been found that at least the greater part of the abrasion of the inner wall of the container takes place approximately at the level of the upper and lower surfaces of the impeller(s) and that this can be reduced or eliminated by increasing the distance between the outer face of the impeller and the wall of the container at these levels. However, in order to obtain satisfactory milling in the apparatus it is necessary to limit the space between the outer face of the impeller and a fixed surface within the container (previously provided by the inner wall of the container).

The purpose of the baffles of the present invention is to enable the walls of the container to be so positioned with respect to the impellers that serious abrasion of wall and baffle is avoided while, at the same time, maintaining the distance between the outer edge of the impeller and a fixed surface at a value to allow satisfactory milling.

If the baffles are made of material which may cause deterioration of the material being milled, for example a ferrous metal in the case of titanium dioxide, it is preferred to ensure that the thickness of the baffles is substantially less than that of the impeller, for example less than one half of the impellers, and to position the baffle so that its central horizontal plane substantially coincides with that of the impeller. By this means the upper and lower surfaces of the baffles are not on the same level as the upper and lower surfaces of the impeller where the greatest abrasion occurs. At the levels of the upper and lower surfaces of the impellers the distance between the wall of the container and the impeller is such as to reduce considerably or eliminate abrasion of wall or baffle.

Alternatively, the baffles and/or the impellers of the present invention may be made of, or coated with a material which resists abrasion, for example polyurethane rubber, as described in British Patent 900,050. It is not so important, with baffles of this type, to ensure that their upper and/or lower surfaces are not on the same level as those of the impellers.

The optimum distance between the inner face of the baffle and the outer face of the impeller for obtaining the best milling of the particulate solid may depend upon several factors, for example the type of pigment being milled, such as rutile or anatase titanium dioxide, the throughput of pigment, the concentration of milling medium in the container and the size of the mill. It is preferred, however, that the distance should be in the range of about ⅜" to 6", for example in the range 1" to 2".

The thickness of the baffles may also vary widely but they will, in general, have a thickness in the range of about ¼" to 3", particularly one in the range ¼" to 1".

If desired, provision may be made in the apparatus of the present invention for means for the introduction of a cooling fluid, for example water, into the interior of the baffle or baffles and for the withdrawal of such a fluid after it has circulated through at least part of the baffle or baffles.

Such means are preferably inlet and outlet ports on the external surfaces of the container leading to a passage within the baffle(s). Where the container splits vertically for dismantling it has been found convenient to provide inlet and outlet ports in each half of the baffle(s), and to maintain the passages in each half of the baffle(s) separate from each other.

The shaft 1 carrying impellers 2 projects into a container 3 which is provided with a feed orifice 4 in the base. Baffles 5 according to the present invention, are fixed to the wall of the container, their inner face opposite the outer face of the impellers by bolts 6 passing through the wall of the container. Leakage from the container is prevented by means of washers 7. Additional baffles 8 are provided to project from the wall of the container into the space between the impellers.

A device of the type described was made up in which the inside diameter of the container was 3'10½" and the height of the container 4'9". A flange was provided at the open end of the container to which is bolted an inverted frustocone 2'10" in height and 6'9" internal diameter at its widest point.

For ease of assembly and dismantling the container was split longitudinally into two halves which were bolted together when the container was in use.

A jacket was formed around the container through which coolant could be circulated in order to maintain the contents of the container at the desired temperature during operation.

The shaft carried six solid impellers each 3'3½" in diameter and 3" thick. The distance between the horizontal centrelines of the impellers was 10". Baffles ⅜" thick projected horizontally into the container between the impellers for a distance of 5" from the wall.

Baffles according to the present invention 2" in width and 1" thick in the form of rings were each bolted by means of twelve ⅜" bolts through the wall of the container and cooling jacket so that their inner face was opposite to the outer face of the impellers. The distance between the inner face of the baffles and the outer surface of the impellers was 1½" whereas the horizontal distance between the impellers and the inner wall of the container at the level of the upper and lower surfaces of the impellers was 3½".

Example

A sand mill having the dimensions described previously was set up. The container and baffles were made of stainless steel and the impellers of solid polyurethane rubber.

In the container was placed 3600 lbs. of sand of particle size in the range 450–700 microns and to the feed orifice in the base of the container was supplied an aqueous slurry containing about 700 g./litre of titanium dioxide particles at a rate of about 1 cu. metre/hour.

The impellers were rotated at 340 r.p.m. and an aqueous slurry of milled titanium dioxide particles was recovered from the settling zone. The iron content of this slurry was estimated.

The mill was stopped, the baffles opposite the impellers were removed and the above process repeated. The iron content of the aqueous slurry of milled titanium dioxide particles was again estimated.

The following results were obtained:

With baffles opposite the impeller—10 p.p.m. Fe (as $Fe_2O_3$).

Without baffles opposite the impeller—15 p.p.m. Fe (as $Fe_2O_3$).

What is claimed is:

1. In a sand milling apparatus comprising a container, characterized as a substantially vertical right cylinder of generally uniform cross-section, a substantially vertical shaft projecting into said container and at least one generally planar, disc-like impeller carried by said shaft and extending outwardly therefrom, and adapted to be rotated within said container by said shaft, the improvement which comprises an inwardly directed baffle in surrounding relation to said shaft and impeller but out of contact therewith, carried by the wall of said container and in contact with said wall over substantially the whole of the baffle periphery, points on the innermost portion of said baffle and on the outermost portion of said impeller defining a plane perpendicular to the longitudinal axis of said shaft.

2. An apparatus in accordance with claim 1 wherein the number of impellers on said shaft is between 2 and 12, each of said impellers having associated therewith a baffle as defined in claim 1.

3. An apparatus in accordance with claim 1 wherein the thickness of each baffle is less than that of the opposing impeller, and wherein each baffle-impeller combination has a common horizontal plane of symmetry.

4. A sand milling apparatus comprising in combination (a) a container, (b) a substantially vertical shaft projecting into said container, (c) between 2 and 12 generally planar impellers spaced along and carried by said shaft, extending outwardly therefrom and adapted to be rotated within said container by said shaft, and (d) an inwardly directed baffle associated with each of said impellers in surrounding relation to said shaft and associated impeller but out of contact therewith, said baffle carried by the wall of said container and in contact with said wall over substantially the whole of the baffle periphery, the thickness of each of said baffles being less than the thickness of the opposing impeller, each of said baffles and the impeller associated therewith having a common horizontal plan of symmetry, each of said baffles provided with means for introducing a cooling fluid into and withdrawing cooling fluid from the interior of said baffle.

5. In a sand milling apparatus comprising a container, a substantially vertical shaft projecting into said container and at least one generally planar impeller carried by said shaft and extending outwardly therefrom, and adapted to be rotated within said container by said shaft, the improvement which comprises an inwardly directed baffle in surrounding relation to said shaft and impeller but out of contact therewith, carried by the wall of said container and in contact with said wall over substantially the whole of the baffle periphery, points on the innermost portion of said baffle and on the outermost portion of said impeller defining a plane perpendicular to the longitudinal axis of said shaft, said baffle provided with means for inducing a cooling fluid into and withdrawing cooling fluid from the interior of said baffle.

References Cited

UNITED STATES PATENTS

| | | | |
|---|---|---|---|
| 768,955 | 8/1904 | Russell | 241—188 X |
| 1,636,033 | 7/1927 | Agnew | 241—275 X |
| 2,316,769 | 4/1943 | Chilson. | |
| 3,160,352 | 12/1964 | Mollring | 241—275 X |
| 1,208,534 | 12/1916 | Foret | 159—6 |
| 2,893,846 | 7/1959 | Wistrich | 23—270 |
| 2,929,107 | 3/1960 | Andrew | 18—47 |
| 2,392,542 | 1/1946 | Matuszak | 259—7 |
| 2,581,414 | 1/1952 | Hochberg | 241—22 |
| 2,914,385 | 11/1959 | Massey | 259—7 X |
| 3,223,336 | 12/1965 | Wienert | 241—172 |
| 3,226,044 | 12/1965 | Matsubayashi | 241—172 |

JAMES M. MEISTER, Primary Examiner

U.S. Cl. X.R.

241—153